United States Patent
Wang et al.

(10) Patent No.: US 10,507,671 B1
(45) Date of Patent: Dec. 17, 2019

(54) DRONE BASED PRINTER

(71) Applicant: KYOCERA Document Solutions Inc., Osaka (JP)

(72) Inventors: Hui Wang, Concord, CA (US); Neil-Paul Payoyo Bermundo, Concord, CA (US); Philip Ver Paloma Dabon, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/100,231

(22) Filed: Aug. 10, 2018

(51) Int. Cl.
| | |
|---|---|
| *B41J 3/36* | (2006.01) |
| *B64C 39/02* | (2006.01) |
| *G08G 5/00* | (2006.01) |
| *G05D 1/08* | (2006.01) |
| *G03B 21/134* | (2006.01) |
| *G06T 7/40* | (2017.01) |

(52) U.S. Cl.
CPC ............... *B41J 3/36* (2013.01); *B64C 39/024* (2013.01); *G05D 1/0816* (2013.01); *G08G 5/0034* (2013.01); *B64C 2201/024* (2013.01); *B64C 2201/126* (2013.01); *G03B 21/134* (2013.01); *G06T 7/40* (2013.01)

(58) Field of Classification Search
CPC ........ B41J 3/36; B64C 39/024; G05D 1/0816; G08G 5/0034
See application file for complete search history.

(56) References Cited

U.S. PATENT DOCUMENTS

| | | | |
|---|---|---|---|
| 2014/0277854 A1* | 9/2014 | Jones | G05D 1/102 701/3 |
| 2016/0272317 A1* | 9/2016 | Cho | G08G 1/09 |
| 2017/0291439 A1* | 10/2017 | Koyata | B41J 29/38 |
| 2017/0305550 A1* | 10/2017 | Whitmarsh | B64D 1/18 |
| 2018/0155018 A1* | 6/2018 | Kovac | B64C 29/0016 |

* cited by examiner

*Primary Examiner* — Bradley W Thies

(57) ABSTRACT

A drone printer configured to print an image on a destination surface includes a flying management module (FMM) and a printing system (PS). The FMM comprises a positioning system configured to detect position of the drone printer in 3-Dimensional (3D) space, and generate a rendering flight plan (RFP) in the 3D space, said RFP being representative of routing path that the drone printer is to follow during printing of the image on the destination surface; and a stabilizer system configured to stabilize the drone printer in the 3D space during any or a combination of flying, aerial manoeuvring, and homing. The PS can include at least one colorant tank; and at least one printing device configured to draw colorant from the at least one colorant tank, and apply the colorant on the destination surface so as to print the image along at least a part of the RFP.

17 Claims, 12 Drawing Sheets

DRONE BASED PRINTER

TECHNICAL FIELD

The present disclosure relates to a drone printer that is configured to print an image on a destination surface.

BACKGROUND

Currently, painting on walls, boundaries/sides of high rise buildings, mounted walls, among other such other inaccessible/difficult to access destination surfaces is performed manually through professionals who need to be taken to the desired heights/areas, and then paint the destination surfaces. This is associated with risks and is very time consuming, especially when re-work is required. Same is the situation also while painting very tall walls, or building façade, or advertising billboards, which requires painters to use suspended platforms, long ladders, or at the least, long paint brushes on really long sticks, which is not only inconvenient but it also has inherent risks for the painters for falling or becoming nauseous being on high suspended platforms.

There is therefore a need in the art for a more efficient technique for painting (also referred to as printing) onto a desired destination surface.

SUMMARY

The present disclosure relates to a drone printer that is configured to print an image on a destination surface. In an aspect, the proposed drone printer can include a flying management module (FMM) and a printing system (PS), wherein the FMM comprises a positioning system configured to detect position of the drone printer in 3-Dimensional (3D) space, and generate a rendering flight plan (RFP) in the 3D space, said RFP being representative of routing path that the drone printer is to follow during printing of the image on the destination surface; and a stabilizer system configured to stabilize the drone printer in the 3D space during any or a combination of flying, aerial manoeuvring, and homing. The PS, on the other hand, can include at least one colorant tank; and at least one printing device configured to draw colorant from the at least one colorant tank, and apply the colorant on the destination surface so as to print the image along at least a part of the RFP.

DETAILED DESCRIPTION

Figure 1:
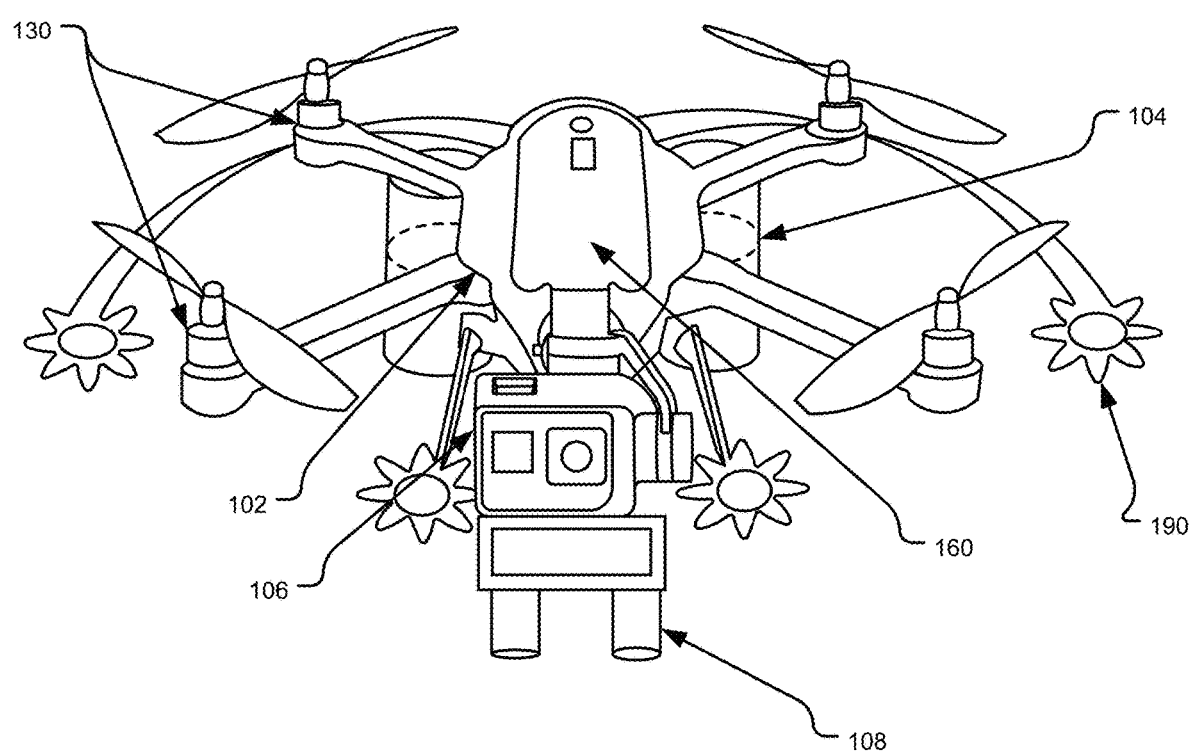
FIG. 1 illustrates exemplary representation of the architecture and structure of the proposed drone printer, in accordance with an aspect of the present disclosure.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

The present disclosure relates to a drone printer that is configured to print an image on a destination surface. In an aspect, the proposed drone printer can include a flying management module (FMM) and a printing system (PS), wherein the FMM comprises a positioning system configured to detect position of the drone printer in 3-Dimensional (3D) space, and generate a rendering flight plan (RFP) in the 3D space, said RFP being representative of routing path that the drone printer is to follow during printing of the image on the destination surface; and a stabilizer system configured to stabilize the drone printer in the 3D space during any or a combination of flying, aerial manoeuvring, and homing. The PS, on the other hand, can include at least one colorant tank; and at least one printing device configured to draw colorant from the at least one colorant tank, and apply the colorant on the destination surface so as to print the image along at least a part of the RFP.

In an aspect, the image can be any or a combination of a text, a pattern, a graphical representation, or a file whose content is to be printed. In another aspect, the positioning system can include, but is not limited to, any or a combination of a GPS, a sonar device, a sensor that generates real-time 3D coordinate position values, and an altitude sensor. Similarly, the stabilizer system, in an aspect, can include a gyro sensor stabilizer system for accurate manoeuvring of said drone printer in said 3D space.

In another aspect, flying of the drone printer along the routing path mentioned in the RFP ensures that a minimum distance is maintained between at least a part of the destination surface and the drone printer.

In yet another aspect, the at least one printing device can include any or a combination of a print head, an air brush, and a print jet for applying said colorant on said destination surface.

In another aspect, the drone printer can be configured to measure any or a combination of texture, altitude, and level of said destination surface before or during printing on said destination surface, based on which said printing on said destination surface is carried out.

In another aspect, the destination surface can be selected from any or a combination of a wall, a ceiling, a roof, a paper based surface, a billboard, a building facade, a polymer based surface, an irregular surface, an inaccessible surface, or a printable medium.

In yet another aspect, the flying management module can further include a limb system having one or more stabilizing limbs to stabilize said drone printer, wherein at least one of said one or more stabilizing limbs can include magnetic ends for metallic destination surfaces or comprises grasping tips for holding on textured or irregular destination surfaces.

In an aspect, the flying management module further can include a limb system having a net-like structure on which said drone printer hooks up for accurate flying, aerial manoeuvring, or homing.

In an aspect, the drone printer can further include a projector configured to receive the image to be printed and project said image onto the destination surface, wherein the RFP can be generated based on attributes of any or a combination of the projected image, the drone printer, and the destination surface. In an aspect, the attributes can include any or a combination of texture of said destination surface, size of said destination surface, size and shape of said projected image, dimension of said drone printer, time delay for drawing and applying said colorant, and orientation of said drone printer.

In an aspect, the colorant tank can be detachably coupled with said drone printer.

In another aspect, the drone printer can further include a camera that enables performing of any or a combination of scanning and texture analysis of said destination surface.

In yet another aspect, the drone printer can be operatively coupled with any or a combination of an air blower, a brush, a broom, a cleaning device, or a sanding paper so as to enable cleaning of the destination surface before, during, or after the printing is carried out.

In another aspect, the drone printer can be operatively coupled with a blower, a fan, a UV light emitter device, or a colorant drying device configured to dry said colorant applied on said destination surface.

The drone printer can also be communicatively coupled with a controller that controls any or a combination of flying, aerial manoeuvring, homing of said drone printer, and printing on said destination surface.

The drone printer can be communicatively coupled with a mobile device that monitors or controls any or a combination of flying, aerial manoeuvring, homing of said drone printer, and printing on said destination surface.

The drone printer can be communicatively coupled with a mobile device that enables generation of printable imaging data for previewing and/or monitoring of rendering process, wherein the mobile device can be any or a combination of a tablet PC, mobile phone, smart phone, wearable device, or a portable computing device.

In an aspect, the present disclosure relates to a drone printer configured to print an image on a destination surface, said drone printer comprising a flying management module (FMM) and a printing system (PS), wherein the FMM can include a positioning system configured to detect position of said drone printer in 3-Dimensional (3D) space; and a stabilizer system configured to stabilize said printer drone in said 3D space during any or a combination of flying, aerial manoeuvring, and homing. PS, on the other hand, can include at least one colorant tank; a projector configured to project said image onto the destination surface; and at least one printing device configured to draw colorant from said at least one colorant tank, and, based on information received from said positioning system with respect to the destination surface, apply the drawn colorant on the destination surface so as to print the image along the projected image.

In an aspect, the proposed Drone Printer (DP) of the present disclosure can be configured to print on inaccessible walls, outdoors or indoors, including ceilings, roofs. The DP can further be configured to measure texture, altitude, and levels of destination surfaces, along with providing preview as projected image onto destination surface. The proposed DP can further be configured to clean paintable surface using blown air or portable brushes, brooms or sanding paper, along with providing drying system for ink applied on destination surfaces.

DEFINITIONS

Destination Surface: can refer to any surface that the drone printer can print on including walls, ceilings, roofs, or other irregular, regular, inaccessible or any other configured/desired surface.

PDL: Page Description Language is data generated from printer drivers. The internal format is one of various PDLs such as XPS, PCL5, PCL6, PDF, PostScript, among others.

MFP: Multi-Function Printer or other imaging devices that generates paper printout or enables a print on a destination surface.

Document: Any file or webpage, including image files, that can be printed are grouped together as document for the purpose of simplicity in this disclosure.

Document Editing Application: All applications that can print a document, webpage, image files, or any other file, are grouped together as document-editing applications, even if their capability is only to view the file to be printed.

Input image data: Input image data comprises image or text that is to be drawn onto the destination surface. This can be in the form of a PDL print job like PDF, XPS, PCL; or an image file like TIFF, PNG, JPG, and similar, or it can be plotter coordinates (i.e., list of XYZ coordinates, and color information for each coordinate that draws some figure, text or image).

Logical Rendering Surface: This is an in-memory logical representation of the image as rendered on a "terrain-like" surface that represents the shape, texture and form of the actual physical destination surface.

Safe Flying Distance: This is the minimum distance between destination surface where image is to be rendered or drawn or painted on, and the drone printer such that the print head is at an effective position to be able to draw or apply ink/toner/paint. This also implies that all parts of drone will be at safe distance so as not to touch, bump or hit the wall or any protruding objects or parts, if there's any. On a flat surface, the safe flying distance can be constant. In reality, where surfaces are irregular due to dents, bumps, curves, depressions, holes, among others, the safe flying distance can be variable.

Rendering Flight Plan: This is a map in 3D coordinate space that describes or represents the routing path or routing directions that the drone will follow to draw the input image data.

With reference to FIG. 1, in an aspect, the proposed DP can include a flying management module (FMM) 102, a printing system (PS) 104, a video system 106, a networking system (not shown here), a cleaning and drying system 108, and a mobile applications and services system (not shown here).

In another aspect, the proposed video system 106 can further include a projection system to project image to be rendered to serve as preview, and a video camera to support scanning and texture analysis of destination surface.

In an aspect, the proposed networking system can be configured or enabled through any or a combination of a wired or wireless communication including but not limited to Wi-Fi, Bluetooth, and Cellular signal, wherein the networking system can provide communication support for controlling the DP.

In an aspect, the proposed cleaning and drying system 108 can enable the DP to load and carry to perform drying of toner, ink or paint material on the destination surface. The proposed cleaning and drying system 108 can be enabled through UV light for drying UV ink, a fan system for air flow drying as examples.

In another aspect, the Mobile Applications and Services can be configured to support flying and controlling of the DP, and for performing and monitoring of its capabilities. The application support can be on a portable computer, mobile phone, tablet, desktop, browser or other computing devices.

Flying Management Module 102

In an aspect, FMM 102 of the present disclosure can be configured to handle or operate or enable overall flying motion of the device, which supports flying, aerial manoeuvring and homing feature. These capabilities can allow for power re-charging, re-loading of tools and toner, ink or paint supplies, and for performing drying and cleaning capabilities. It would be appreciated that although the technology for flying aspect of this module mostly exists in drones, except that the current drones only either capture still pictures or moving videos. There is no drone that outputs video onto a wall (i.e., a flying projector), and there is no drone that actually emits ink or any other marking material to put drawing, paint, or other markings on any surface in a manner that is precise or accurate, planned or non-random, programmed, smart to re-adjust or reposition according to a rendering flight plan, mart to pick up tools and reload with ink/toner/paint material, smart to perform aerial manoeuvre to dry, protect and clean.

In an aspect, FMM 102 of the proposed DP can enable new capabilities from the included gyro sensors, altitude sensors, and focusing lasers to add more stability, control and tracking capabilities, new rendering capabilities from its built-in printing system, new preview and projection capabilities from its Video and Projection System. These new capabilities and features will enable the Drone Printer (DP) to accurately and efficiently render images onto destination surfaces. It will also take advantage of availability of a limb system and other ideas so that the Drone Printer can prop itself up on the side of walls, whenever possible.

In an aspect, the proposed FMM 102 can include a Positioning System 130 that provides built-in support for position detection in 3D-space. In an exemplary aspect, the positioning system 130 can include, but is not limited to, any or a combination of a GPS sensor, a sonar sensor, and an altitude sensor. The FMM 102 can further include a Stabilizer System 160 that can include, but is not limited to, Gyro and other sensors for accurate maneuvering in 3D-space. In another aspect, FMM 102 can further include a Limb System 190 that can include robotic arms that can have magnetic ends or feet for printing on metallic destination surfaces, or include grasping tips for holding on textured or irregular destination surfaces. The limb system 190 can be configured so as to impart additional stability, whenever possible, for rendering accuracy.

It would be appreciated that instead of robotic arms, any other element such as net-like system similar to a spider's web, can be configured, and therefore all these embodiments described in the present disclosure are exemplary and do not limit the scope of the present invention. In the spider's web implementation, the DP can include just one or two strings that the DP can hook up to for more accurate movement on the surface. The proposed stabilizer and/or limb systems therefore provide more stability when the wind outdoors provides challenges on the drone.

Figure 2:
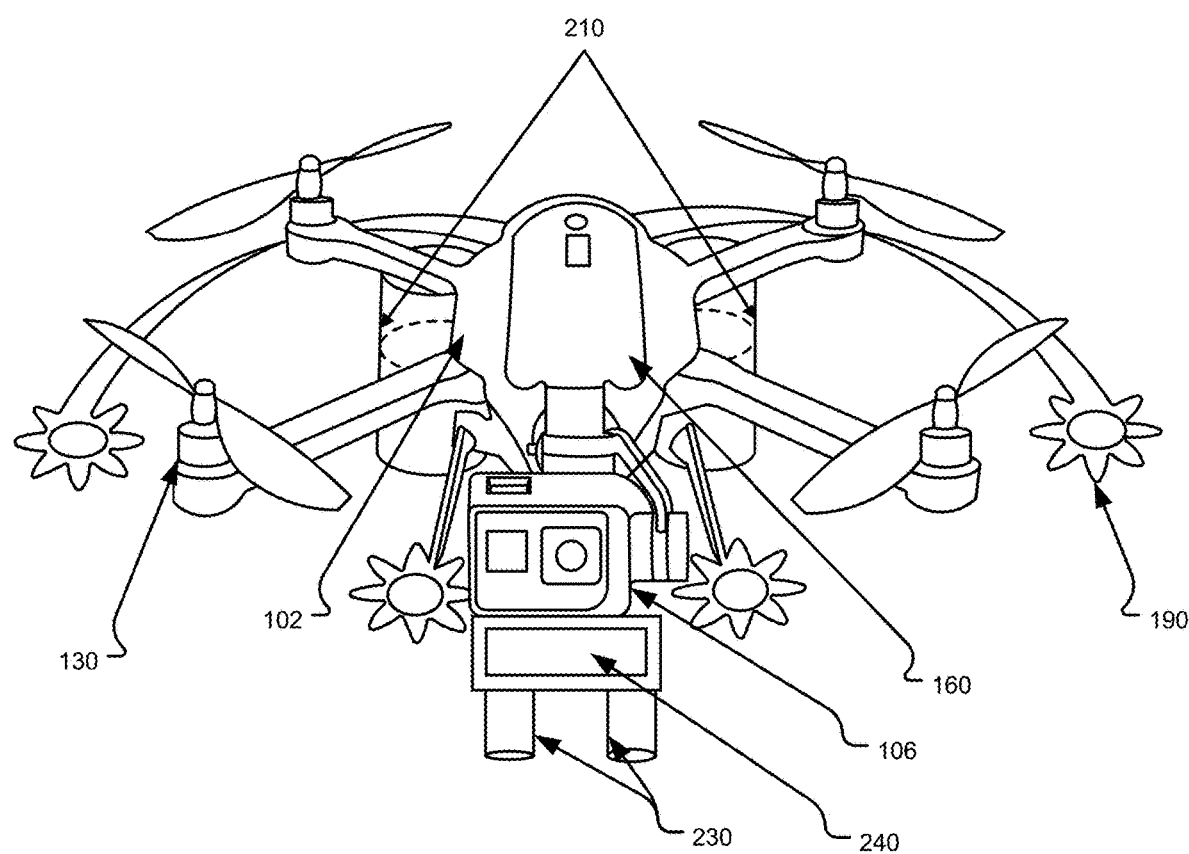
FIG. 2 illustrates another exemplary representation of the proposed drone printer, in accordance with an aspect of the present disclosure.

In an aspect, with reference to FIG. 2, the proposed DP can further include any or a combination of a colorant/ink/toner/paint tanks 210, a video camera and/or projection system 106, one or more retractable UV drying guns and cleaning tools 230 for drying/cleaning the destination surface after the printing action, a print head/air brush/paint jet 240 to enable the painting/printing on the destination surface, and one or more stabilizing limb system 190 as explained above with reference to FIG. 1.

Positioning System 130

In an aspect, as mentioned above, the positioning system 130 can include a GPS, one or more sonar and altitude sensors for detecting position of drone in 3D space, wherein the said sensors can generate real-time 3D coordinate position values that can be used to determine position of print head and relative position of the drone itself to the destination surface.

Figure 3:
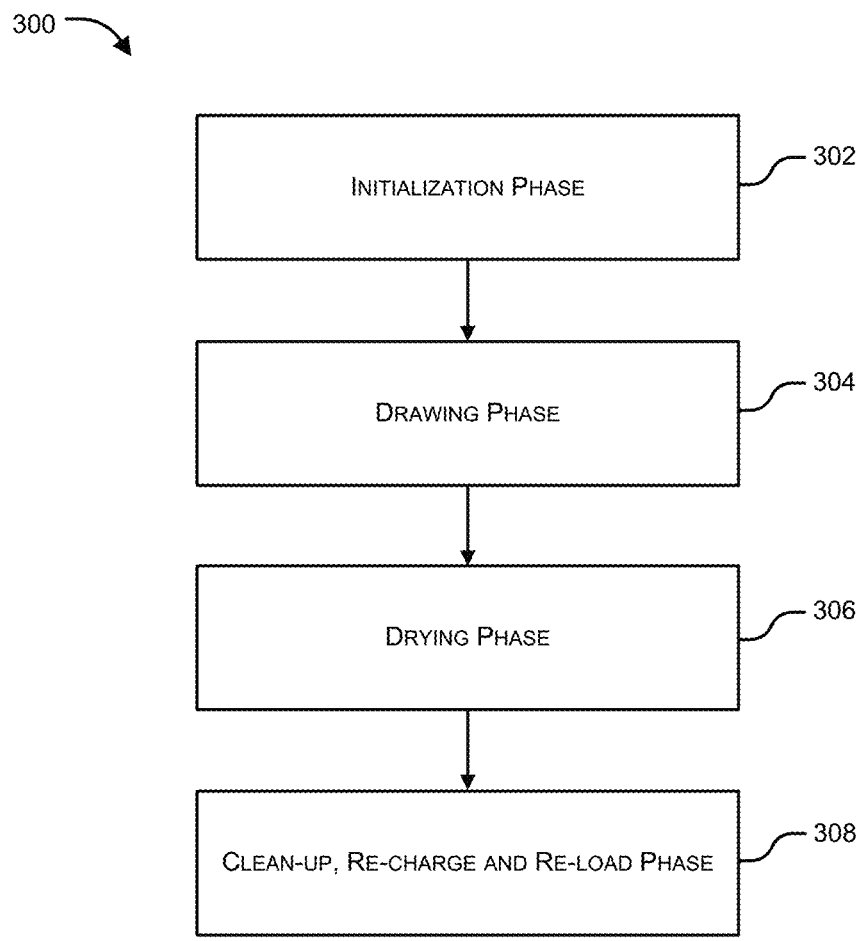
FIG. 3 illustrates an exemplary flow diagram showing high level functional flow of the proposed drone printer, in accordance with an aspect of the present disclosure.

In an exemplary aspect, the positioning system 130 can include a tracking system sub-component to track movement of the drone printer (DP), wherein the tracking data can be used to allow the DP to follow specific coordinate positioning instructions that correspond to image being rendered onto the destination surface. With reference to FIG. 3, positioning system 130 of the present disclosure can include an Initialization Phase 302 where the DP can be positioned on the destination surface, a Drawing Phase 304 where the DP can perform drawing on the destination surface, optionally a Drying Phase 306 where the paint/ink on the destination surface can be dried, and a Clean-Up, Re-charge and Re-load Phase 308 that enables re-charging of battery, reloading of ink/toner/paint, and clean-up.

Figure 4A:
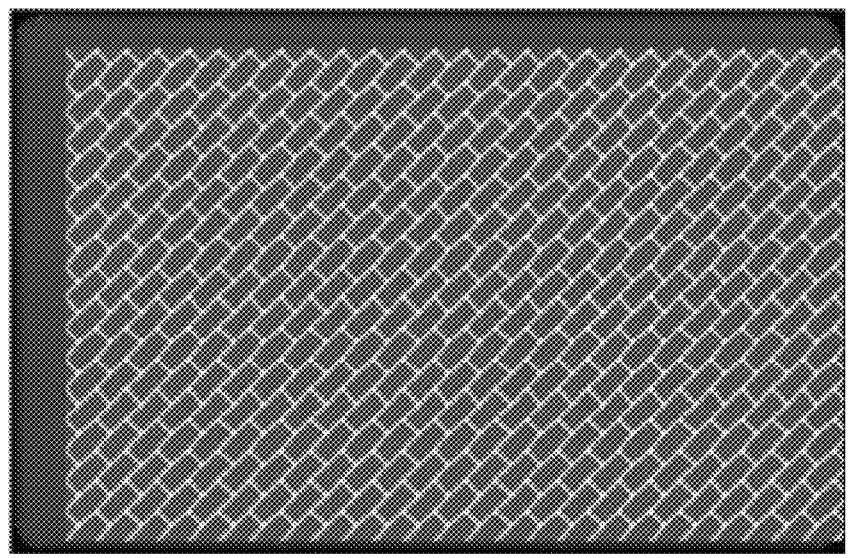
FIG. 4A and FIG. 4B illustrate exemplary printed destination wall surface and logical rendering surface, in accordance with an aspect of the present disclosure.
Figure 4B:
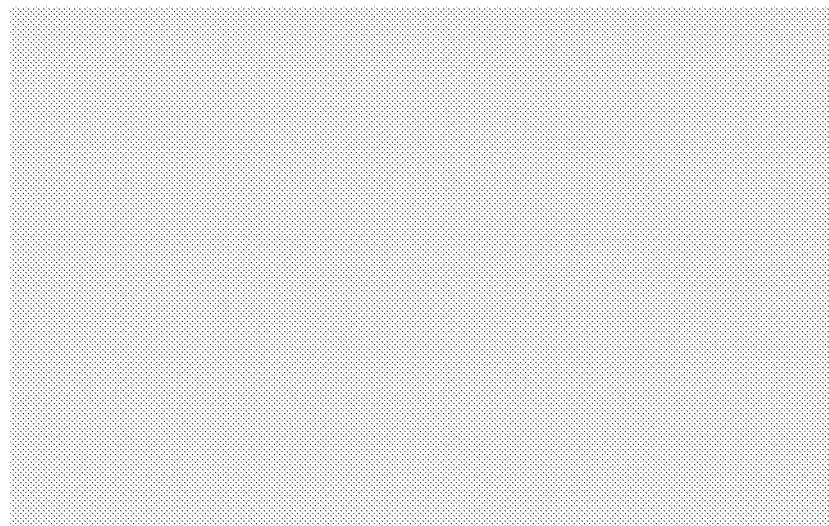
Figure 6:
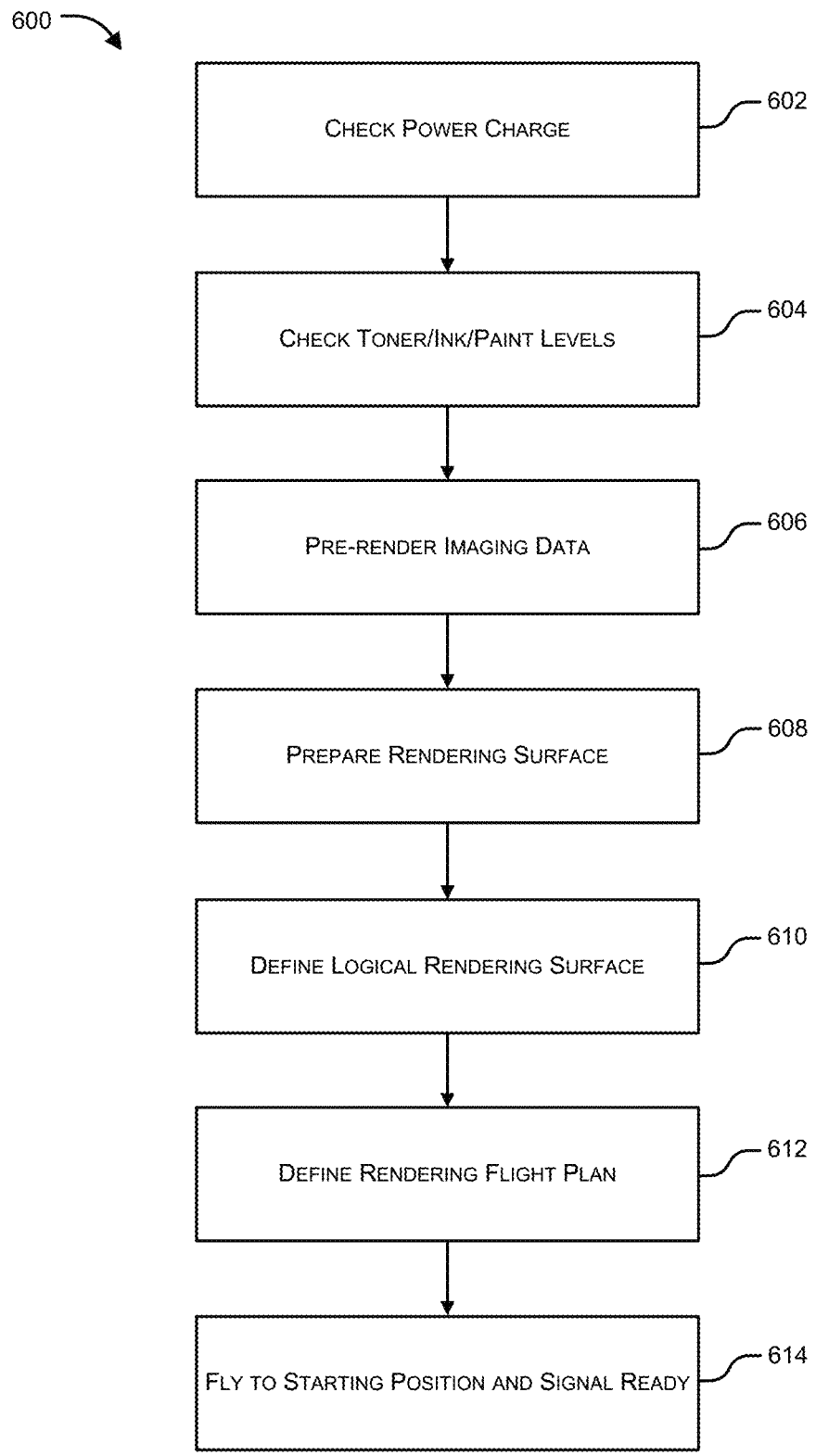
FIG. 6 illustrates an exemplary flow diagram showing definition of RFP, in accordance with an aspect of the present disclosure.

In an aspect, in the initialization phase 302, the DP can initially be prepared for the drawing or "printing" job. Drone printer can be fully charged with electricity or battery power (Step 602 of FIG. 6). Ink or paint tanks can be filled and loaded onto drone printer (Step 604 of FIG. 6). If needed, the drone printer can be hooked with hoses or other methods to ink or paint sources. Image to be rendered can be loaded next to a suitable/deployed mobile application and fed onto drone printer (Step 606 of FIG. 6). There can be various modes for providing imaging data to the drone such as run-time (image or text is drawn on user interface in mobile application during this initialization or even during flight time or preloaded (through software as PDL print job or image file). Next, the drone printer can be flown to the destination surface. Using Projection and Video systems, the image data (which can be PDL print job or actual image file) that is to be drawn can be processed and rendered in the Printing System and projected onto the destination surface (Step 608 of FIG. 6). The drone can be configured to measure the projected image on the destination surface, including measurement of surface texture and obstacles like dips, dents, raised wood panels and so forth. In the drone printer's memory, it can draw a rendering surface based on these measurements (Step 610 of FIG. 6). In abstract form, the logical rendering surface can be like a terrain map. In an aspect, the DP can then apply and re-render the imaging data onto the logical rendering surface. In an example, a logical rendering surface can be a rectangular or square area that is flat and has no creases, bumps or dents. A complex logical rendering surface, on the other hand, can be where there are several dents, bumps or curvatures that the drone will adjust during drawing and flying time. FIGS. 4A and 4B illustrate exemplary logical rendering surfaces.

Figure 5A:
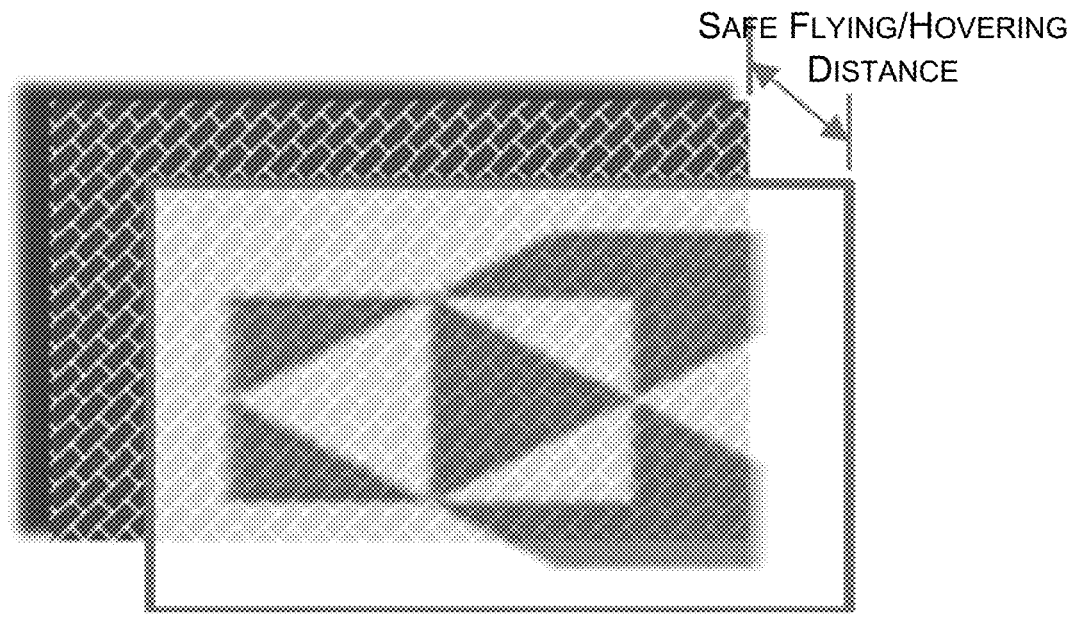
FIGS. 5A and 5B illustrate exemplary rendering flight plan (RFP) illustrations, in accordance with an aspect of the present disclosure.
Figure 5B:
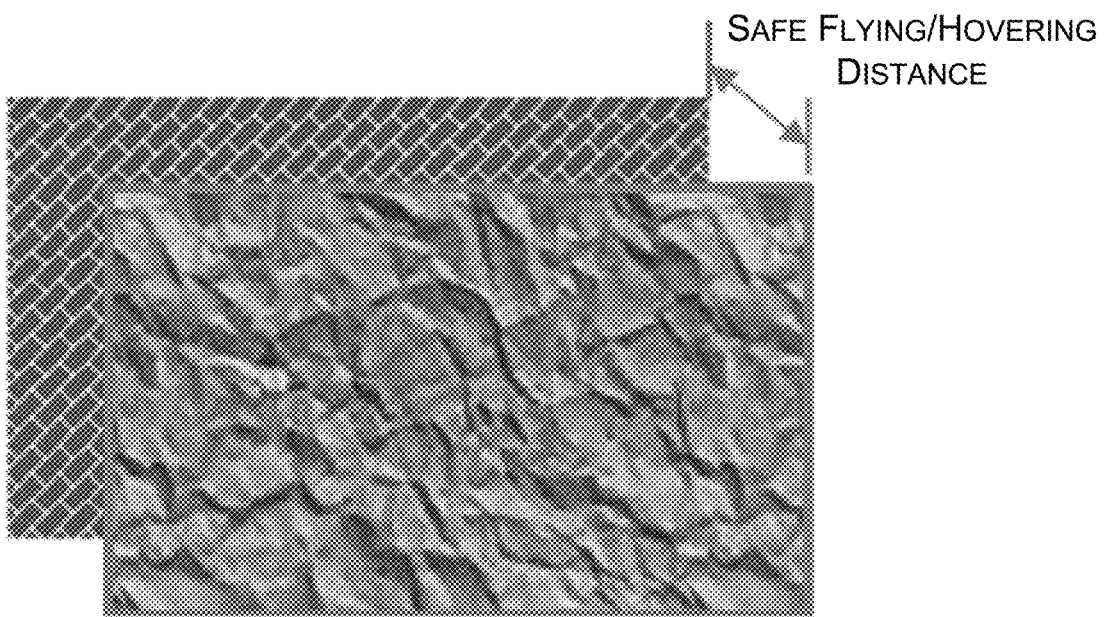

In an aspect, the logical rendering surface can be represented by dimensions (width, height) and 3D XYZ coordinates on the destination surface. Based on the logical rendering surface, the Positioning System 130 can create a rendering flight plan (RFP) and perform optimization of the flight plan coordinates for efficient routing and flying paths (Step 612 of FIG. 6). The RFP can be referred to as mapping of coordinates in logical rendering surface and the destination surface and a safe flying or hovering distance for the drone (Step 614 of FIG. 6). FIGS. 5A and 5B illustrate exemplary RFPs with regular and irregular surfaces, respectively. In an aspect, logo can be a virtual, imaginary representation of the 3D XYZ coordinates that the drone would follow when executing the Drawing Phase 304. At this safe flying and hovering distance, print head of the DP can be in efficient and effective drawing or painting position for applying the ink or paint onto the destination drawing surface. FIG. 5A shows a safe and flying distance that does not change much because the destination surface is almost flat. In case the destination wall has an irregular surface, the RFP can be generated so as to reflect irregularity of the surface, where the 3D XYZ coordinates will allow the drone to move forward and backward or in other directions with respect to the wall in order to be able to apply paint or ink effectively, and be able to cover all parts of the destination surface. In other words, the safe flying or hovering distances in the rendering flight plan will vary. An example of a rendering flight plan for an irregular surface is shown below.

In an exemplary aspect, creased or rumpled appearance in the example surface of FIG. 5B is merely an exemplary illustration of the generated RFP, which in the software and firmware implementation, can include, but is not limited to, 3D-space XYZ coordinates that factors in irregularity of actual surface, dimension of drone system, position of print-head/air brush/paint jet, based on which safe flying distance can be maintained, wherein the safe flying distance can be variable.

In another aspect, RFP can further include Color/Paint/Toner values at each coordinate, which can be rasterized imaging data that can be a combination of color planes combined with an irregular surface rendering flight plan map. RFP of the present disclosure can further include other parameters needed in positioning of drone, for instance, gyro position to tilt or fly the drone at an angle or time delay to allow the toner/ink/paint to be applied for a certain period of time.

In an aspect, another step in the Initialization Phase 302 can include where the drone next flies to the starting point or the origin where the drawing or painting can be started. In an example, the starting point can be at the top-left corner or other position in the rendering flight plan such that in that position, there will be an actual part of the image that will be rendered or drawn with ink or paint. The drone need not go to or stop at a position where there will be no ink or paint to be applied. This can be an empty space or blank space in the image. In the above example, such areas can be white areas that are representative of blank or transparent space. If there's actual white ink/paint/color, the space can be considered non-blank or non-empty, and may cause the drone to stop or pause in those points or areas.

Figure 7:
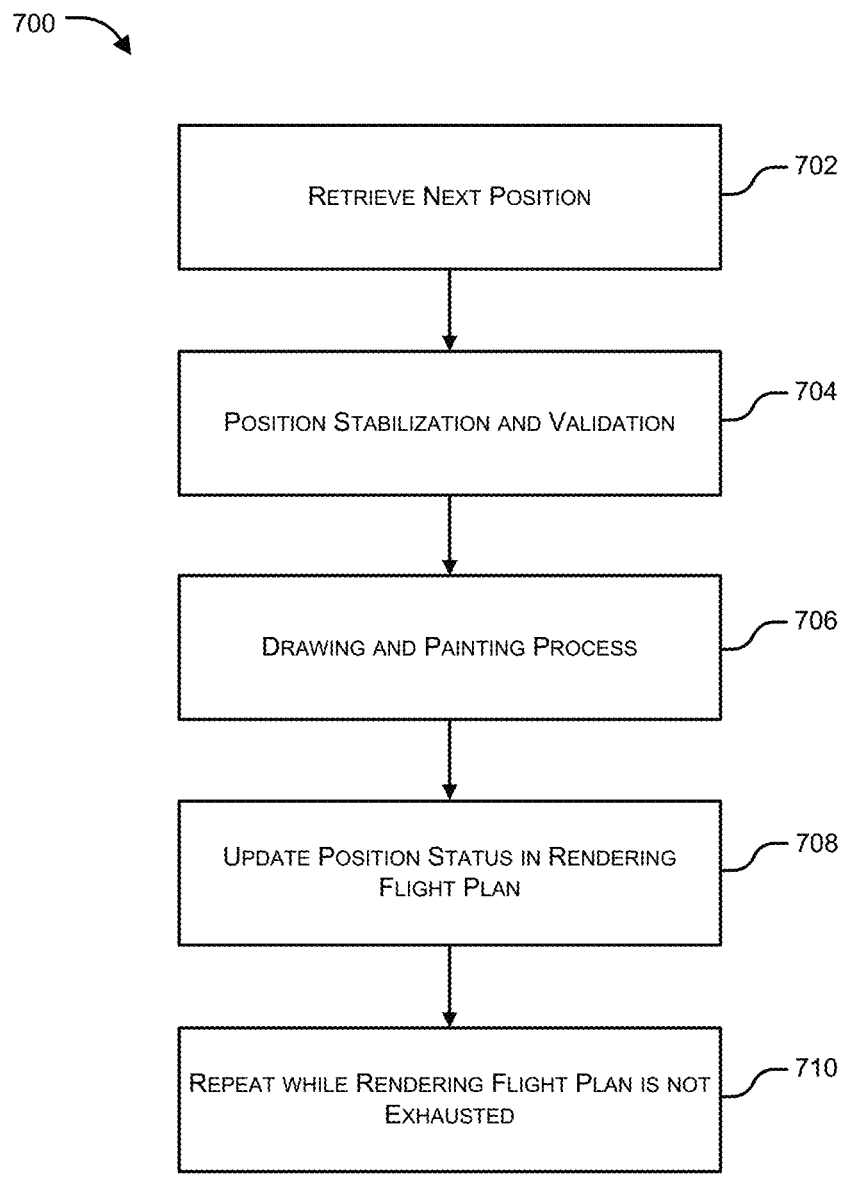
FIG. 7 illustrates an exemplary flow diagram showing execution of RFP, in accordance with an aspect of the present disclosure.

In an aspect, the drawing phase 304 can include the process of actual painting/printing/drawing operation on the destination surface, wherein the drawing can be started once a specific/pre-defined notification/signal/message is received from the controls. Control can be in a remote control or mobile application that can be operated on the ground. Once the notification signal is received, the DP locks onto the origin, and activates the Stabilizer System to start the drawing process. In an aspect, the drawing process can include the steps of retrieving next coordinate from Rendering Flight Plan from Positioning System 130 (step 702 of FIG. 7), continuously detecting accurate position of print head according to flight plan coordinate and destination surface position (step 704 of FIG. 7). This step can further include positioning the drone printer to accurate 3D coordinate according to rendering flight plan and the destination surface position. The drawing phase 304 can further include and/or enable the printing system to draw or apply ink or paint onto the destination surface (step 706 of FIG. 7), and mark coordinate as used and performed in the RFP (step 708 of FIG. 7). At step 710, the drawing phase can include repeating the above steps until the RFP is completed. During the drawing phase, whenever the DP or the application/system configured in the controlling device detects low level of paint or ink or low battery charge, it can pause the drawing phase, and instruct the DP to return to "base" or "charging and loading" station for ink/paint refill or power recharging. It may return to a docking station where the paint/ink refills and power-recharging can be done all at once, either manually by a person or automatically by a robotic or other automated system.

In an aspect, in the drying phase 306, video and other sensors in the drone can be used to detect any wet or un-dry ink or paint material in the destination surface, and apply air and perform drying maneuvers to hasten drying of drawn image on the destination surface. Similarly, in the phase 308, several background activities for re-charging of battery, reloading of ink/toner/paint, and clean-up and other wrap-up procedures can be performed/carried out. The drone system may be instructed to perform maneuvers in order to accomplish this, such as flying back to docking station, or applying its tools to generate wind or direct its limb system to use tools to perform clean-up and drying processes on the destination surface. At the end, the Positioning System completes its operation by flying the drone back to the docking station, where the system may be finally re-charged or re-loaded with ink/toner/paint.

Stabilizer System 160

Figure 8:
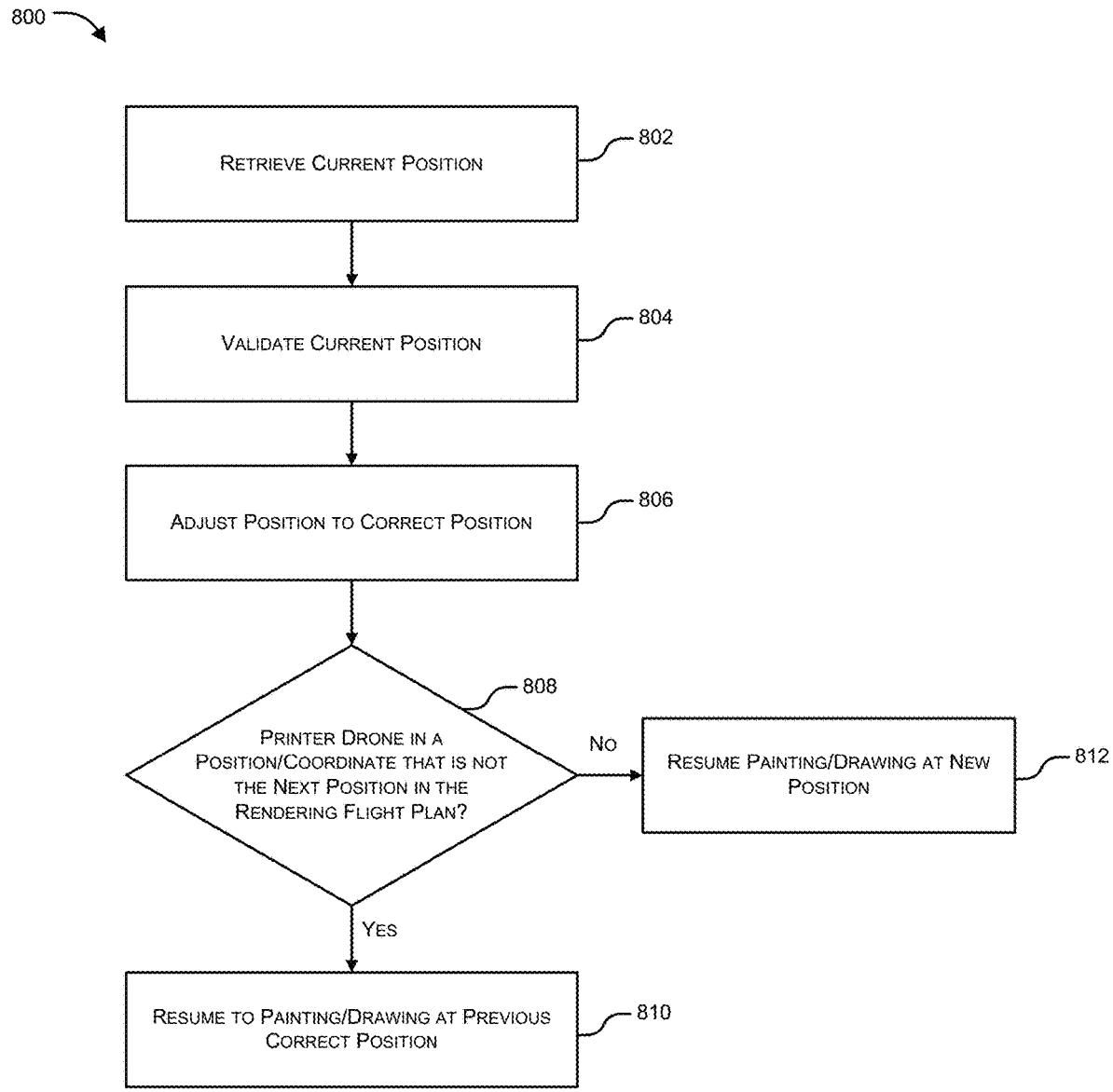
FIG. 8 illustrates an exemplary flow diagram showing implementation of stabilizer system, in accordance with an aspect of the present disclosure.

In an aspect, the proposed Stabilizer System (SS) 160 can be configured to use data gathered from sensors in the Positioning System 130 to detect unintentional shifting, slide, fall, rise or other movements during the drone flying maneuvers to adjust and instruct the drone to go back to original flight plan, which is according to the drawing parameters of the image to be rendered. With reference to FIG. 8, the proposed Stabilizer System 160 can include, at step 802, retrieval of current position from the Positioning System, at steps 804 and 806, comparison and validation of current position and RFP, and at step 808, if any slide, shift, rise, fall, or other movement that tells the system it is in a coordinate/position/area/location that is not the next position in the rendering flight plan, it can resume painting/drawing at that point if that point is part of the rendering flight plan (step 812); or can go back and resume from the last known position in the rendering flight plan (step 810).

Limb System 190

In an aspect, the proposed limb system 190 is an optional or connectable component to the drone printer, an example of which is shown in FIG. 2 above. The limb system 190 can, in an embodiment, include robotic arms or legs that have finger- or claw-like tips to be able to grasp and prop the drone system on surfaces, as necessary. Tips of the fingers or claws themselves can have non-smearing materials like rubber or foam in order to not cause bleeding or smearing and not leave marks on surfaces that may have already been painted/drawn on.

Printing System (PS) 104

Figure 9A:
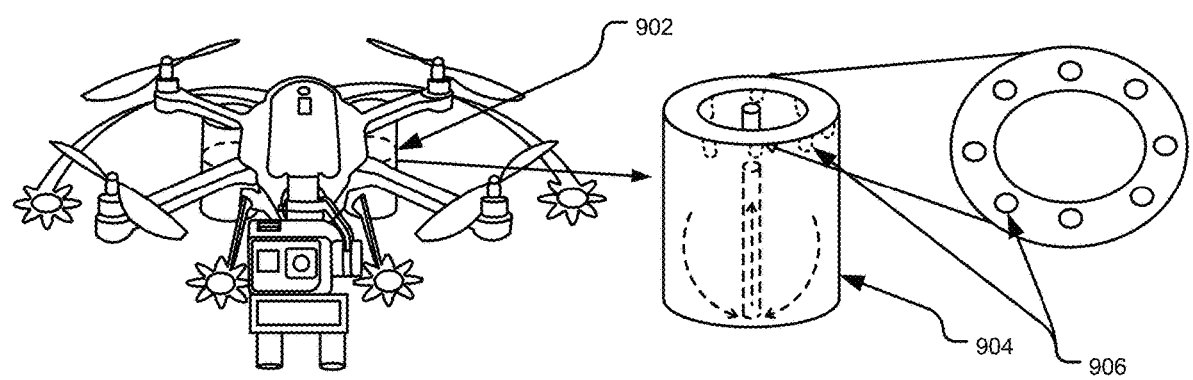
FIGS. 9A and 9B illustrate exemplary representations showing tank assembly with magnetic connectors along with multi-tank holster and single cartridge system with multi-ink, in accordance with an aspect of the present disclosure.

In an aspect, PS 104 of the present disclosure can include a Docking System (alternatively, referred to as docking station) (not shown), a Toner/Ink/Paint Tank System 902, and a RIP Firmware and Rendering Component (not shown), as depicted in FIG. 9A. The Docking System of the DP can be configured as an automatic service system that can be a robot system or an automatic electrical and mechanical system. It also can be switched to manual mode for operation by a person. When Drone Printer flies back to Docking station, power level can be checked and the battery can be re-charged if charge is lower than certain level. In addition, toner level can also be checked and toner refilling or replacement can be done if toner is lower than certain level. In addition, dust level can also be checked, and the DP be cleaned if dust is dirtier than certain level. In addition, the docking system can enable re-validation of imaging data (video or printing data), if necessary. The DP can be configured to enable self-toner replacement using Docking System. In an aspect, when DP is out of toner, it can fly back to the docking station. The Docking System can also be configured to apply automatic toner refilling or replacement service.

In an aspect, the docking station can support the networking system such that the docking station includes a Wi-Fi router onto which the drone printer connects in real-time, and onto which mobile devices and mobile applications are connected to. The docking station may also include shared storage for both the drone printer and mobile application for sharing of printable imaging data. The docking station may further include server software to coordinate, synchronize and schedule access to shared memory, storage, and processing power whenever such services are needed by both drone printer and connected mobile devices.

Figure 9B:
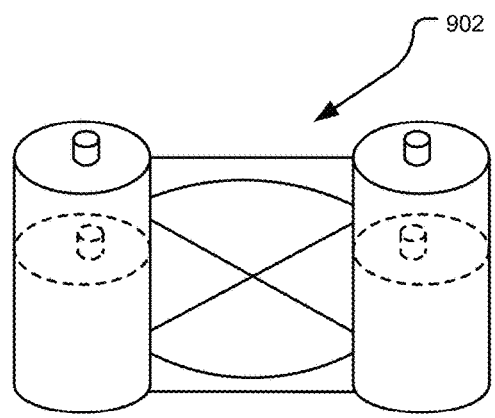

In an aspect, the proposed Toner/Ink/Colorant/Paint System 902 can include a tank system print mechanism that works through a tank system. In an aspect, the proposed DP can include or be operatively coupled to a refillable or replaceable tank system 904 that the DP can pick up and attach into its body for serving up toner, ink, colorant, or paint supply to the printing system component of the device. The tank assembly can have magnetic components 906 to easily attach and detach the tank from new ink/toner/paint tank or containers. This is illustrated in FIGS. 9A and 9B.

In an exemplary aspect, metallic connectors on the canisters can connect to magnetic connectors at bottom of drone tank/cartridge receptacles. The drone can release magnetic connection to drop canisters/cartridge to docking station or recycling bins. The drone can activate magnetic connection to pick up and re-attach new canisters/cartridges or re-filled ones. This exemplary design is only for illustration purposes and does not limit the scope of the present invention in any manner. Therefore, there can always be variations of this design to adapt to cartridge/canister technologies, all of which possible implementations are well within the scope of the present invention. In an aspect, the proposed DP can be configured so as to support re-fill or attaching of new toner/ink/paint supplies, when needed, to be able to accomplish the objective of printing large images in walls and other destination surfaces. As mentioned above, the refilling or attachment of new canisters/cartridges could be performed manually or automatically. Another aspect of the toner/ink/paint tanks or canisters is that they can easily be picked up by or released from the drone. As such, the containers will be held in a fixed structure so that they are stationary or fixed and strongly held together as drone picks them up or releases them for re-fill. In either multi-tank ink system, it is possible to support replacement or refilling of each tank individually or as a group, and it can be done either manually or automatically through magnetic pick-up/release mechanism as described above.

In an aspect, the proposed DP can accomplish printing on various settings such as outdoors or indoors and on various surfaces such as walls, metal surfaces, wood surfaces or fences, or on either porous and non-porous surfaces that establishes requirement for various inking or painting materials.

In another aspect, the present disclosure can further require adding of protective layer or material with the ink or paint. In an aspect, the ink can be UV ink (Ultraviolet Ink) that is suitable not only for indoors but for outdoors and for most type of surfaces, especially non-porous surfaces. UV ink requires photomechanical process for drying, and it can dry on almost any surface such as on a metal based surface.

In an aspect, photomechanical drying can be accomplished using a UV drying gun that the drone printer holds either at the nose, on one of the limbs, or as a tool that can be picked up, carried, attached and pointed onto the surface.

In another aspect, the ink or toner can be regular inkjet or toner that may be used on surfaces such as wood or surfaces with paper or paper-like material, wherein the ink or toner may attach onto the surface. In another aspect, the regular paint can be used on fences, houses, metal surfaces, roofing sheets, and so on.

In yet another aspect, a protective layer can be added on top of the ink or toner to protect the painted surface from the elements (wind, rain, water, insects, among others).

In an embodiment, a primer paint tank or cartridge can be used to seal surfaces as needed. Use of a paint material can imply that the drone printer accomplishes the rendering or drawing using either brush or spray. Paint can be suctioned or extracted to flow onto the brush or spray head. Paint can also be programmatically applied on the surface based on the printable data in the drone printer system.

In an aspect, as mentioned above, the tank can include a protective coating material of, for instance, resin type, wherein the protective coating can often be referred to by their generic resin type, such as acrylic, alkyd, epoxy or polyurethane. In another way, it can be identified by the type of resin and curing agent used, such as epoxy amine, where amine is the curing agent.

In an aspect, after printing with any or one of the ink or painting materials, another layer of protective coating can be applied onto the destination drawing surface. This can be accomplished by spraying or re-rendering but using the protective coating material as the ink/paint material. In an instance, the protective coating can be varnish, which is just another type of resin. It can be sprayed or brushed onto the surface. It is a good protective material as it forms a shiny, strong and transparent layer when it dries.

In an aspect, the DP can include or carry a Plastic Lamination material, wherein depending on the destination surface, it may be possible to adhere or iron-in a thin layer of transparent plastic sheet on top of the painted/drawn surface.

In an aspect, application of Protective Coating is optional that can be turned On or Off by the operator. This can save the coating material on destination surface that does not require protective layer, such as indoors or wood (which absorbs paint). The use of varying ink or painting materials implies that the drone may pick up one type or a combination of ink or paint containers/tanks/cartridges/canisters as it performs the rendering on the destination surface. This also implies that depending on the printing/painting project, it is possible to contain more than the usual number of tanks/cartridges. For example, a fifth tank in a CMYK cartridge system may be carried as it contains the protective coating material needed to cover the rendered image on the destination surface as soon as the image is printed/painted onto the surface.

In an aspect, printing mechanism of the present disclosure can include any or a combination of a print head that applies toner or ink to surface, an air brush that uses air to push paint material to surface, or a paint jet that combines air brush technology and regular print head technology to apply paint material to destination surface.

In an aspect, the proposed printing mechanism can include a combination of air brush with small and hundreds of nozzles for precise application of tiny jets of paint material to surface. The releasing of paint material can be programmatically done to be able to select color and amount of material to release.

In another aspect, the proposed printing system can include or be operatively coupled with an integrated RIP firmware, including rendering component that controls a print head that emits toner, ink or paint out into the destination surface.

Figure 10:
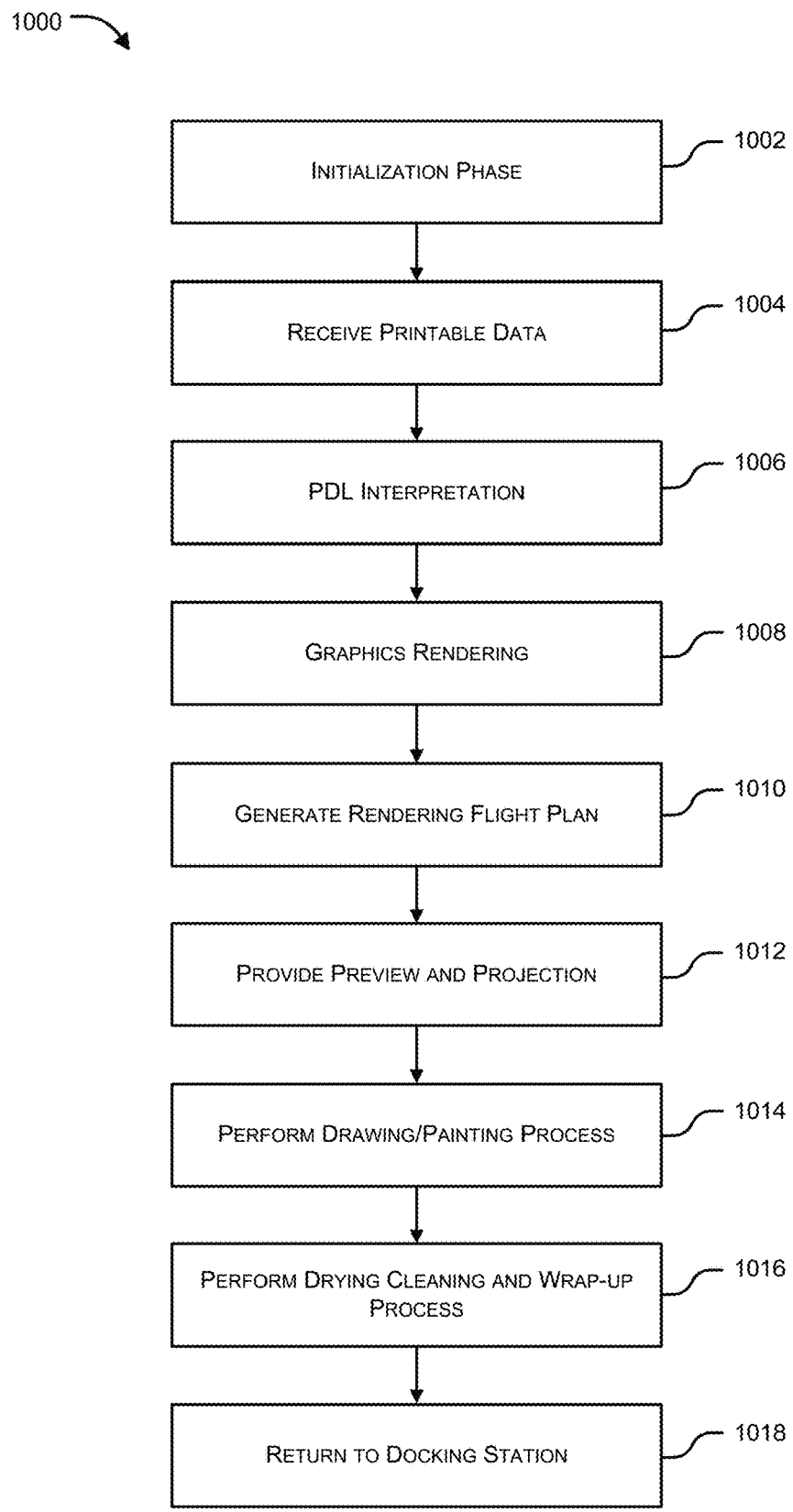
FIG. 10 illustrates an exemplary flow diagram showing execution of RFP, in accordance with an aspect of the present disclosure.

In an aspect, with reference to FIG. 10, as part of the initialization phase at step 1002, drone printer system of the present disclosure can be configured to receive instructions from mobile application for locating destination surface, which includes measurement of the destination surface area, its texture and other factors to help determine printing or painting suitability. At step 1004, rendering component of the present disclosure can be configured to receive printable data from mobile applications, portable computers or desktop computers, wherein the data can include any PDL print job. Data can also include, but is not limited to, image files (JPG, TIFF, PNG, BMP and other photo files). At step 1008, data can further include scribbling or typed commands as plotter data. At step 1010, Interpreter processes received data, and converts and image or rendered file. Interpreter scales up, if necessary, the created image file or rendered file to the dimension of the selected destination surface.

In an aspect, at step 1012, the proposed DP may project through the projector camera the created image file onto the destination surface for preview to the user. The projected image can be captured and streamed back to the applications for user review such that once the system is ready and when user clicks "Start", the Drone Printer will begin actual rendering and application of toner, ink or paint onto the destination surface as can be seen at step 1014. In an aspect, if the Drone Printer can use its Limb System, it can prop itself up onto and around the destination surface for stability and better rendering accuracy. At step 1016, the Drone Printer can use its Drying System to finalize and add protective layer onto the rendered image on the destination surface, and then at step 1018, return to docking station.

In an exemplary aspect, video system module configured in the Drone Printer can allow for retrieval of video or image feedback that can be reviewed by user or artist using a previewing device such as a tablet or phone or handheld controller. It can also allow for the projection of image onto the destination surface so that user or artist may finalize how their image will be positioned, aligned, or sized onto the destination surface.

Figure 11:
FIG. 11 illustrates an exemplary representation showing preview of a building, in accordance with an aspect of the present disclosure.

As would be appreciated, when printing an image to a destination surface, it can be hard to imagine if the image actually looks good or not in the target position with the surrounding environment. The drone printer of the present disclosure therefore provides preview functionality by equipping the drone with a projector that projects the target image onto the destination surface. The projection feature can enable Zoom up and down the image size with scale factors, shift image horizontally and vertically on the destination surface, rotate image with any angle both clockwise and counterclockwise, detect vertical and horizontal coordinate values for a location on the destination surface where a light beam from projector is pointed to, project highlight rectangular or some other shapes onto the destination surface for dimension measurement, alignment, and scaling, remote controlling by a reviewer. FIG. 11 below shows a crew member using application drone printer projector camera to preview the advertisement on the building.

In another aspect, video camera module of the present disclosure can add support for scanning and texture analysis of destination surface. This can be a module that reads projected image or highlighting rectangular or other shapes projected by the projector onto the destination surface. The Video Camera, in an exemplary implementation, can gather and provide this captured data to the Drone Printer to actually do the measurements, alignments, and scaling, which data can be provided to the user or artist for designing their artwork, images, document, scribbles, and others that they can eventually print or paint onto the destination surface.

In an aspect, appropriate communication support for controlling the drone printer device can be configured, wherein various connectivity methods can be supported, such as Wi-Fi, Bluetooth, NFC and even Cellular signal for better coverage.

In another aspect, Cleaning and Drying System of the present disclosure can include tools that the drone can load and carry to perform drying of toner, ink or paint material on the destination surface. There can be UV light for drying UV ink, or a fan system for air flow drying as examples.

Figure 12:
FIG. 12 illustrates an exemplary representation showing mobile drone printer controller, in accordance with an aspect of the present disclosure.

In another aspect, software applications configured in the mobile phones, tablets, desktops and other computing devices can provide services for controlling and handling of drone printer, for the generation of printable imaging data, for previewing and monitoring of rendering process, for guided plotting and drawing, and aerial maneuvers for demonstrating capabilities and features in this drone printing technology. A sample remote control device is shown in FIG. 12. As can be seen, display of the proposed remote control device can be a touchscreen device where drawing and writing can be performed to design or edit or view an image. There would also be a logical or physical keyboard to allow for writing of text, selection of features or data, and for other manipulation of displayed image or open illustration document.

As would be appreciated, the proposed invention pertains to a functional printer system that can process image, document, text or illustration that is edited, drawn, loaded, or shown on the display and send the printable or paintable data to the drone printer. This means that there is a software that generates the printable data that is to be transmitted to the drone printer in real-time to enable the drone printer. In an exemplary aspect, the printable data can be transmitted as-is to the drone printer, and processed to the RIP Firmware in the drone. Alternatively, the printable data can be pre-rendered in the mobile device or at a server device, and the pre-rendered image can be transmitted to the drone printer. In any case, the mobile device and the mobile applications can add new capabilities that are not available currently and locally in mobile devices or handheld controllers for real-time transmission to a drone printer.

Also, in another embodiment, there can be several form factors for the Drone Printer, including 2D Drone Printer that can be a regular, full-size Drone Printer device that can accomplish printing on high walls, side of high buildings, and so on. This can also be wireless and untethered to any toner/ink/paint supply. The supplies can be in tanks attached or carried by the drone printer device. In another aspect, the DP can be a miniature 2D/3D Drone Printer that can be used for printing or painting on indoor walls or other destination surfaces. It is possible that such a DP is plugged including for power and/or toner/ink/paint supply. Such a miniature drone printer may be able to print in XYZ axes and provide better accuracy to print any shape and size of 3D model compared to existing 3D printers.

As would be appreciated, the present invention has the image processing technologies like RIP, PDL interpretation, image generation and application of ink onto destination surface. It provides other capabilities that allows for smarter, efficient, flexible, and exciting ways to draw, paint, or write on walls and other surfaces, including irregular surfaces. The present invention enables the DP to retrieve data from the drone positioning sensors (GPS, gyro and altitude sensors) in order to calculate, position, and operate the drone in a precise, intentional or programmed way so as to allow a printing system to draw accurately a printable image data onto walls or surfaces that are normally painted, drawn or written on manually. The present invention is for emitting, generating, rendering output onto a wall, not capturing them.

The present invention has been described herein with reference to a particular embodiment for a particular application. Those having ordinary skill in the art and access to the present teachings will recognize additional modifications applications and embodiments within the scope thereof. For example, the invention is not limited to the biasing arrangements shown herein. Those skilled in the art will appreciate that the kickers may be rigidly mounted (instead of pivotally mounted) with an inherent spring force in lieu of a biasing spring.

It is therefore intended by the appended claims to cover any and all such applications, modifications and embodiments within the scope of the present invention.

Moreover, other implementations of the present application will be apparent to those skilled in the art from consideration of the specification and practices of the example implementations disclosed herein. Various aspects and/or components of the described example implementations may be used singly or in any combination. It is intended that the specification and examples be considered as examples, with a true scope and spirit of the application being indicated by the following claims.

The invention claimed is:

1. A drone printer configured to print an image on a destination surface, said drone printer comprising:
   a projector configured to receive the image to be printed and project said image onto the destination surface;
   a flying management module comprising:
      a positioning system configured to detect position of said drone printer in 3-Dimensional (3D) space, and generate a rendering flight plan (RFP) in said 3D space, said RFP being representative of routing path that said drone printer is to follow during printing of said image on said destination surface, wherein the RFP is generated based on one or more attributes of any or a combination of the projected image, the drone printer, and the destination surface;
      a stabilizer system configured to stabilize said drone printer in said 3D space during any or a combination of flying, aerial manoeuvring, and homing; and
   a printing system comprising:
      at least one colorant tank; and
      at least one printing device configured to draw colorant from said at least one colorant tank, and based on information received from the positioning system apply said colorant on said destination surface so as to print said image along at least a part of the RFP with respect to the projected image.

2. The drone printer of claim 1, wherein said positioning system comprises any or a combination of a GPS, a sonar device, a sensor that generates real-time 3D coordinate position values, and an altitude sensor.

3. The drone printer of claim 1, wherein said stabilizer system comprises a gyro sensor stabilizer system for accurate manoeuvring of said drone printer in said 3D space.

4. The drone printer of claim 1, wherein flying of said drone printer along the routing path mentioned in the RFP ensures that a minimum distance is maintained between at least a part of the destination surface and the drone printer.

5. The drone printer of claim 1, wherein the at least one printing device comprises any or a combination of a print head, an air brush, and a print jet for applying said colorant on said destination surface.

6. The drone printer of claim 1, wherein said drone printer is configured to measure any or a combination of texture, altitude, and level of said destination surface before or during printing on said destination surface, based on which said printing on said destination surface is carried out.

7. The drone printer of claim 1, wherein said flying management module further comprises a limb system having one or more stabilizing limbs to stabilize said drone printer.

8. The drone printer of claim 7, wherein at least one of said one or more stabilizing limbs comprises magnetic ends for metallic destination surfaces or comprises grasping tips for holding on textured or irregular destination surfaces.

9. The drone printer of claim 1, wherein said flying management module further comprises a limb system having a net-like structure on which said drone printer hooks up for accurate flying, aerial manoeuvring, or homing.

10. The drone printer of claim 1, wherein the one or more attributes comprise any or a combination of texture of said destination surface, size of said destination surface, size and shape of said projected image, dimension of said drone printer, time delay for drawing and applying said colorant, and orientation of said drone printer.

11. The drone printer of claim 1, wherein the at least one colorant tank is detachably coupled with said drone printer.

12. The drone printer of claim 1, wherein said drone printer further comprises a camera that enables performing of any or a combination of scanning and texture analysis of said destination surface.

13. The drone printer of claim 1, wherein said drone printer is operatively coupled with any or a combination of an air blower, a brush, a broom, a cleaning device, or a sanding paper so as to enable cleaning of said destination surface before, during, or after said printing is carried out.

14. The drone printer of claim 1, wherein said drone printer is operatively coupled with a blower, a fan, a UV light emitter device, or a colorant drying device configured to dry said colorant applied on said destination surface.

15. The drone printer of claim 1, wherein said drone printer is communicatively coupled with a controller that controls any or a combination of flying, aerial manoeuvring, homing of said drone printer, and printing on said destination surface.

16. The drone printer of claim 1, wherein said drone printer is communicatively coupled with a mobile device that monitors or controls any or a combination of flying, aerial manoeuvring, homing of said drone printer, and printing on said destination surface.

17. The drone printer of claim 1, wherein said drone printer is communicatively coupled with a mobile device that enables generation of printable imaging data for previewing and/or monitoring of rendering process.

* * * * *